United States Patent
Lin et al.

(10) Patent No.: US 8,477,482 B2
(45) Date of Patent: Jul. 2, 2013

(54) TOUCH CONTROL PANEL SECURING DEVICE AND ELECTRONIC APPARATUS HAVING THE TOUCH CONTROL PANEL SECURING DEVICE

(75) Inventors: Li-Sheng Lin, Taipei Hsien (TW); Kun-Shan Lee, Taipei Hsien (TW)

(73) Assignee: Wistron Corporation, New Taipei (TW)

( * ) Notice: Subject to any disclaimer, the term of this patent is extended or adjusted under 35 U.S.C. 154(b) by 430 days.

(21) Appl. No.: 12/946,943

(22) Filed: Nov. 16, 2010

(65) Prior Publication Data

US 2011/0304961 A1 Dec. 15, 2011

(30) Foreign Application Priority Data

Jun. 15, 2010 (TW) .............................. 99211417 U

(51) Int. Cl.
*H05K 5/00* (2006.01)
*H05K 7/00* (2006.01)
*G06F 1/16* (2006.01)

(52) U.S. Cl.
USPC ............ 361/679.01; 361/679.26; 361/679.55; 361/679.56

(58) Field of Classification Search
USPC ............. 361/679.01, 679.26, 679.55, 679.56, 361/679.18
See application file for complete search history.

(56) References Cited

U.S. PATENT DOCUMENTS

| | | | | |
|---|---|---|---|---|
| 5,793,355 | A * | 8/1998 | Youens | 345/157 |
| 6,219,038 | B1 * | 4/2001 | Cho | 345/173 |
| 6,281,887 | B1 * | 8/2001 | Wang | 345/173 |
| 7,119,291 | B2 * | 10/2006 | Sun | 200/5 A |
| 7,233,314 | B2 * | 6/2007 | Shih | 345/156 |
| 7,719,827 | B2 * | 5/2010 | Mihara et al. | 361/679.27 |
| 7,729,519 | B2 * | 6/2010 | Shigenobu et al. | 382/116 |
| 7,920,378 | B2 * | 4/2011 | Mihara et al. | 361/679.55 |
| 2002/0050024 | A1 * | 5/2002 | Murayama | 16/221 |
| 2009/0147470 | A1 * | 6/2009 | Nakatani et al. | 361/679.55 |
| 2010/0277856 | A1 * | 11/2010 | Stoltz | 361/679.06 |
| 2012/0026739 | A1 * | 2/2012 | Mihara et al. | 362/253 |

* cited by examiner

*Primary Examiner* — Anthony Haughton
(74) *Attorney, Agent, or Firm* — Dickstein Shapiro LLP

(57) ABSTRACT

A touch control panel securing device is used for fixing a touch control panel. The touch control panel includes a housing formed with an opening, the touch control panel being mounted within the housing and being registered with the opening; at least one pressing member for pressing the touch control panel, and including a first engaging portion engaging the housing, and a second engaging portion disposed opposite to the first engaging portion; and a locking mechanism including at least one engaging part for engaging the second engaging portion and a pressing part operable to be pressed for disengaging the engaging part from the second engaging portion.

20 Claims, 18 Drawing Sheets

TOUCH CONTROL PANEL SECURING DEVICE AND ELECTRONIC APPARATUS HAVING THE TOUCH CONTROL PANEL SECURING DEVICE

CROSS REFERENCE TO RELATED APPLICATION

This application claims priority of Taiwanese Application No. 099211417 filed on Jun. 15, 2010, the disclosure of which is hereby incorporated by reference.

BACKGROUND OF THE INVENTION

1. Field of the Invention

The present invention relates to a touch control panel securing device and an electronic apparatus having the touch control panel securing device. More particularly, the present invention relates to a touch control panel securing device that is used for mounting fixedly a touch control panel, and that allows for easy assembly and disassembly, and to an electronic apparatus having the touch control panel securing device.

2. Description of the Related Art

Referring to FIGS. 1 and 2, Taiwan Patent No. M299325 discloses a touch control panel securing device that includes a securing plate 11 for mounting fixedly a touch control panel 12 to a top plate 13 of a notebook computer. The securing plate 11 includes a plate body 111 that is formed with a pair of engaging holes 112 proximate to a right lateral side thereof. Each of the engaging holes 112 is registered with an engaging hook 131 formed on an inner side of the top plate 13 for engagement therewith. The plate body 111 is further formed with a pair of through holes 113 proximate to a left lateral side thereof. Each of the through holes 113 is registered with a threaded hole 132 formed on an inner side of the top plate 13, and a fastener 14 extends through the through hole 113 and the threaded hole 132, such that the securing plate 11 is fixed to the top plate 13.

When it is desired to secure the touch control panel 12 on the inner side of the top plate 13, the touch control panel 12 is first placed on the inner side of the top plate 13 in such a manner that a plurality of protruding ribs 133 formed on the inner side of the top plate 13 abut against a peripheral edge of the touch control panel 12. Next, the engaging hooks 131 of the top plate 13 are registered and engage the engaging holes 112 of the securing plate 11, and the through holes 113 of the securing plate 11 are aligned with the threaded holes 132 of the top plate 13. Finally, the fasteners 14 are extended through the through holes 113 and engaged with the threaded holes 132 using a screwdriver, such that the securing plate 11 is secured to the top plate 13, and presses against the touch control panel 12 to secure the same on the inner surface of the top plate 13.

Since a tool such as a screwdriver is needed to assemble the securing plate 11 to and disassemble the securing plate 11 from the top plate 13, assembly and disassembly are inconvenient. Hence, repair and replacement of the touch control panel 12 involves a significant amount of assembly and disassembly time. As a result, there is a need to devise a touch control panel securing device which allows for easy assembly and disassembly of the touch control panel 12.

SUMMARY OF THE INVENTION

Therefore, the object of this invention is to provide a touch control panel securing device that can easily and quickly assemble a touch control panel to a housing or disassemble a touch control panel from a housing to thereby minimize assembly and disassembly time.

Another object of this invention is to provide an electronic apparatus having a touch control panel securing device, in which the touch control panel securing device can easily and quickly assemble a touch control panel to a housing or disassemble a touch control panel from a housing to thereby minimize assembly and disassembly time.

According to one aspect of this invention, the touch control panel securing device for fixing a touch control panel comprises: a housing formed with an opening, the touch control panel being mounted within the housing and being registered with the opening; at least one pressing member for pressing the touch control panel, and including a first engaging portion engaging the housing, and a second engaging portion disposed opposite to the first engaging portion; and a locking mechanism including at least one engaging part for engaging the second engaging portion and a pressing part operable to be pressed for disengaging the engaging part from the second engaging portion.

According to another aspect of this invention, the electronic apparatus having a touch control panel securing device comprises a touch control panel and a touch control panel securing device. The touch control panel securing device comprises a housing formed with an opening, the touch control panel being mounted within the housing and being registered with the opening, at least one pressing member for pressing the touch control panel, and including a first engaging portion engaging the housing, and a second engaging portion disposed opposite to the first engaging portion; and a locking mechanism including at least one engaging part for engaging the second engaging portion and a pressing part operable to be pressed for disengaging the engaging part from the second engaging portion.

Hence, the advantages and effects of this invention reside in that a touch control panel can be easily and conveniently mounted fixedly to or dismounted from the housing so that assembly and disassembly time is reduced.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENT

Figure 1:
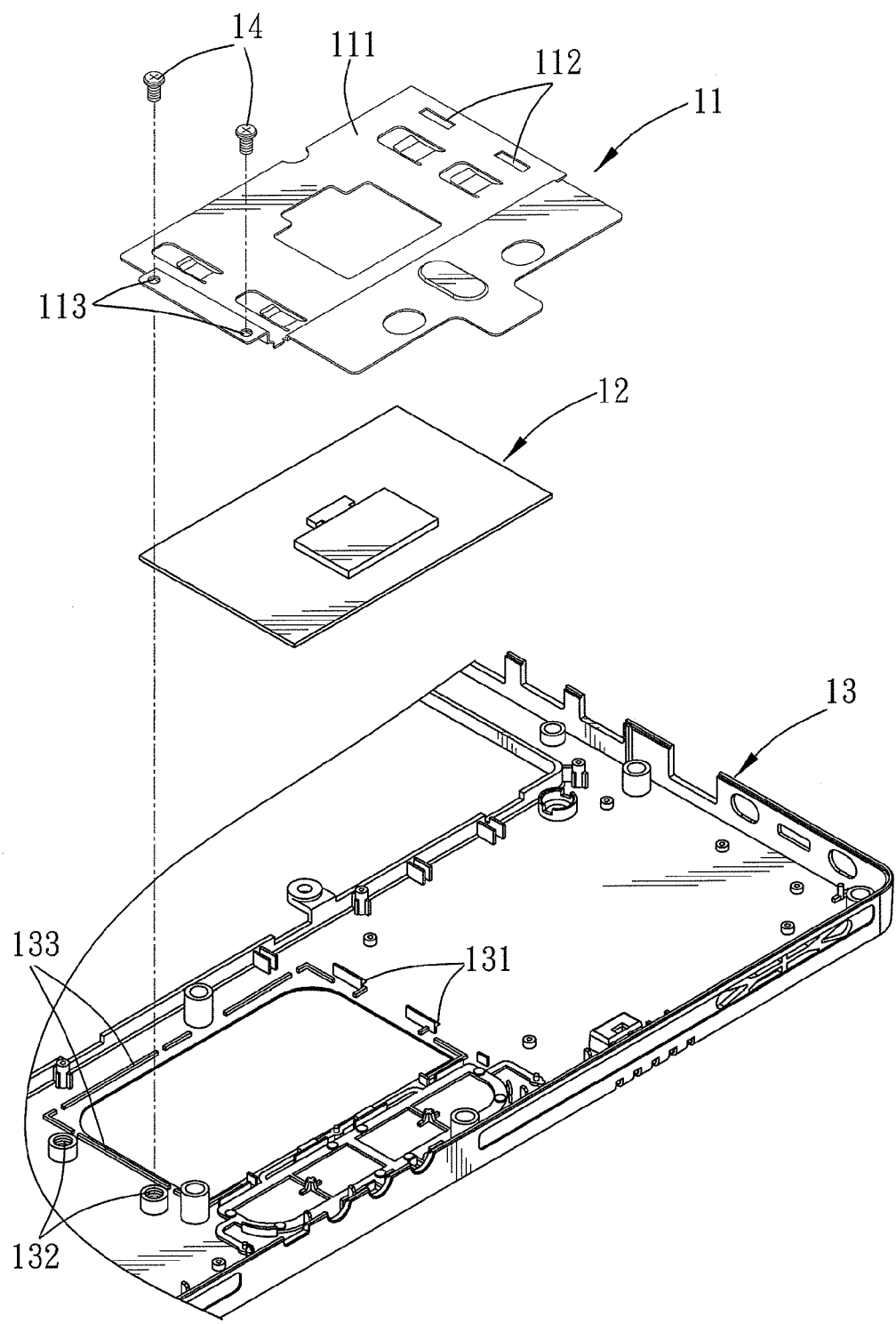
FIG. 1 is an exploded perspective view of an embodiment disclosed in Taiwan Patent No. M299325.
Figure 2:
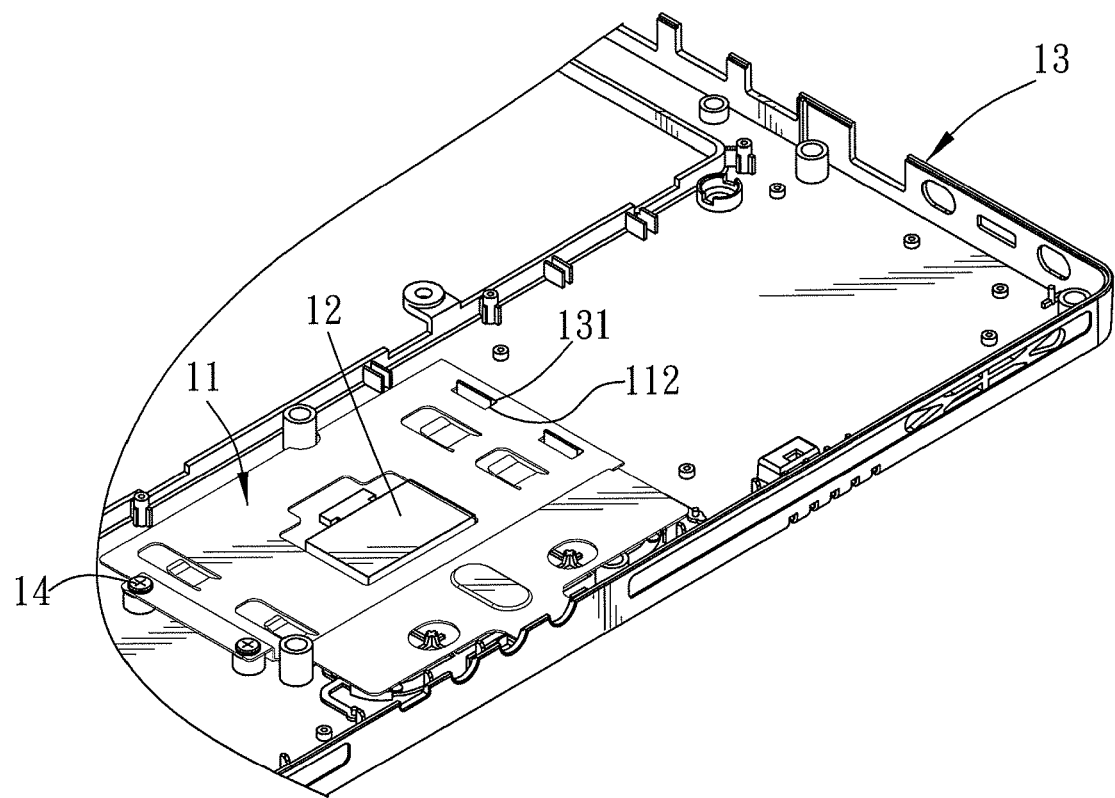
FIG. 2 is an assembled perspective view of an embodiment disclosed in Taiwan Patent No. M299325.

Before the present invention is described in greater detail with reference to the accompanying preferred embodiment, it should be noted herein that like elements are denoted by the same reference numerals throughout the disclosure.

Figure 3:
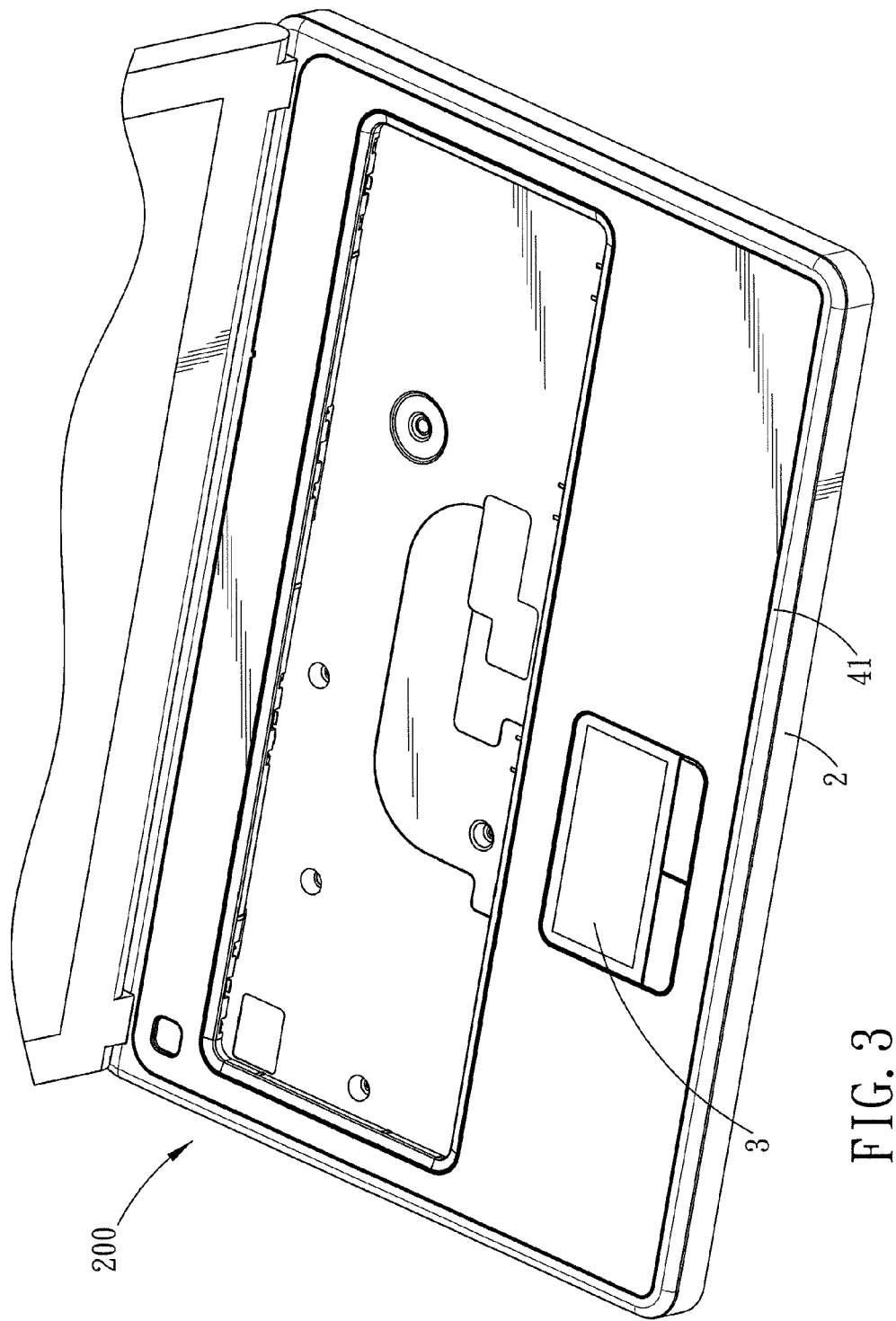
FIG. 3 is a perspective view of the first preferred embodiment of an electronic apparatus having a touch control panel securing device according to the present invention.
Figure 4:
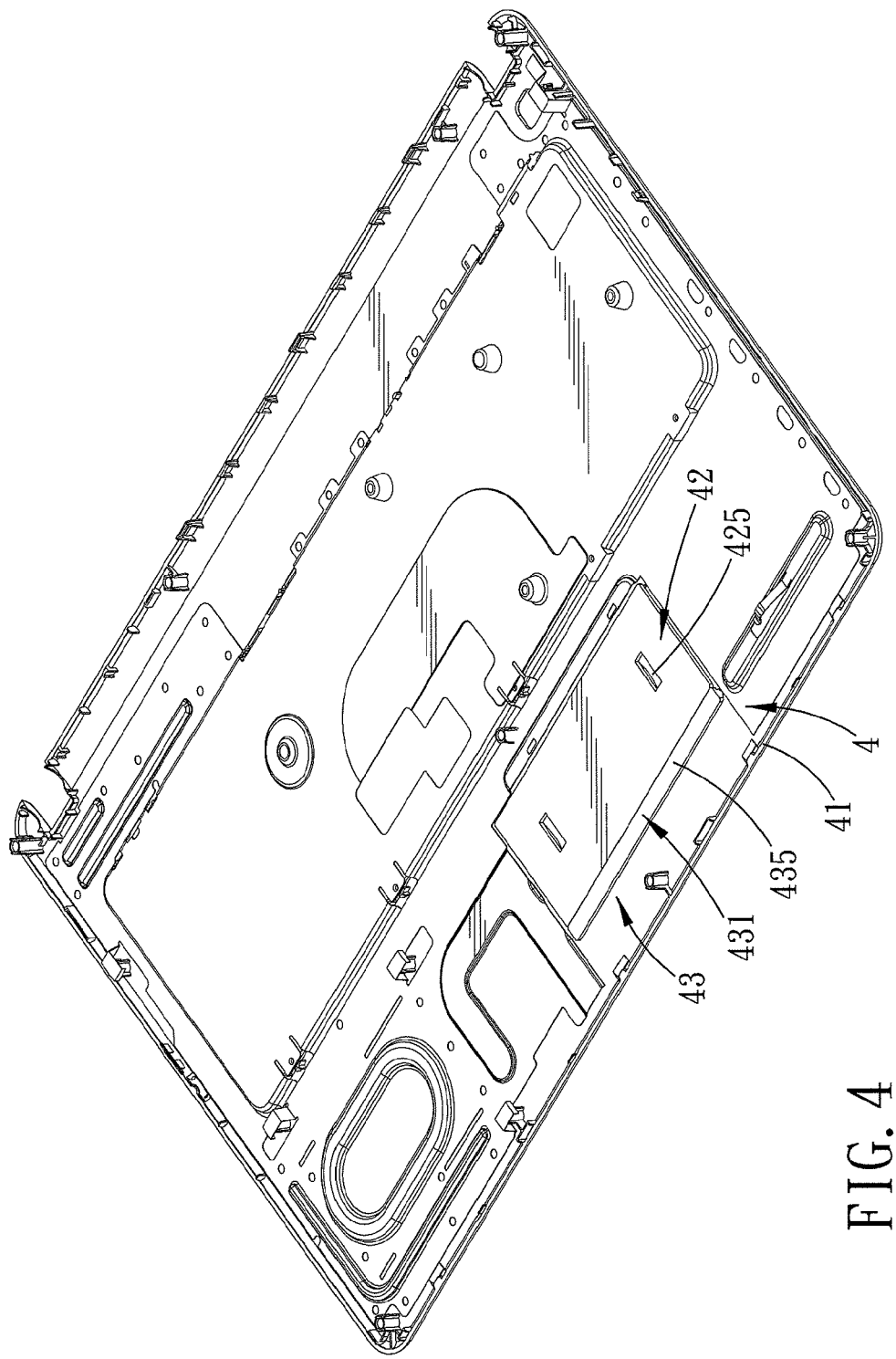
FIG. 4 is a perspective view of the first preferred embodiment of a touch control panel securing device of an electronic apparatus according to the present invention.

Referring to FIGS. 3 and 4, the first preferred embodiment of an electronic apparatus 200 of this invention is shown by way of example to be a notebook computer. The electronic apparatus 200 includes a bottom casing 2, a touch control panel 3, and a touch control panel securing device 4. In practice, the electronic apparatus 200 may also be a tablet computer or another electronic apparatus having a touch control panel 3.

Figure 5:
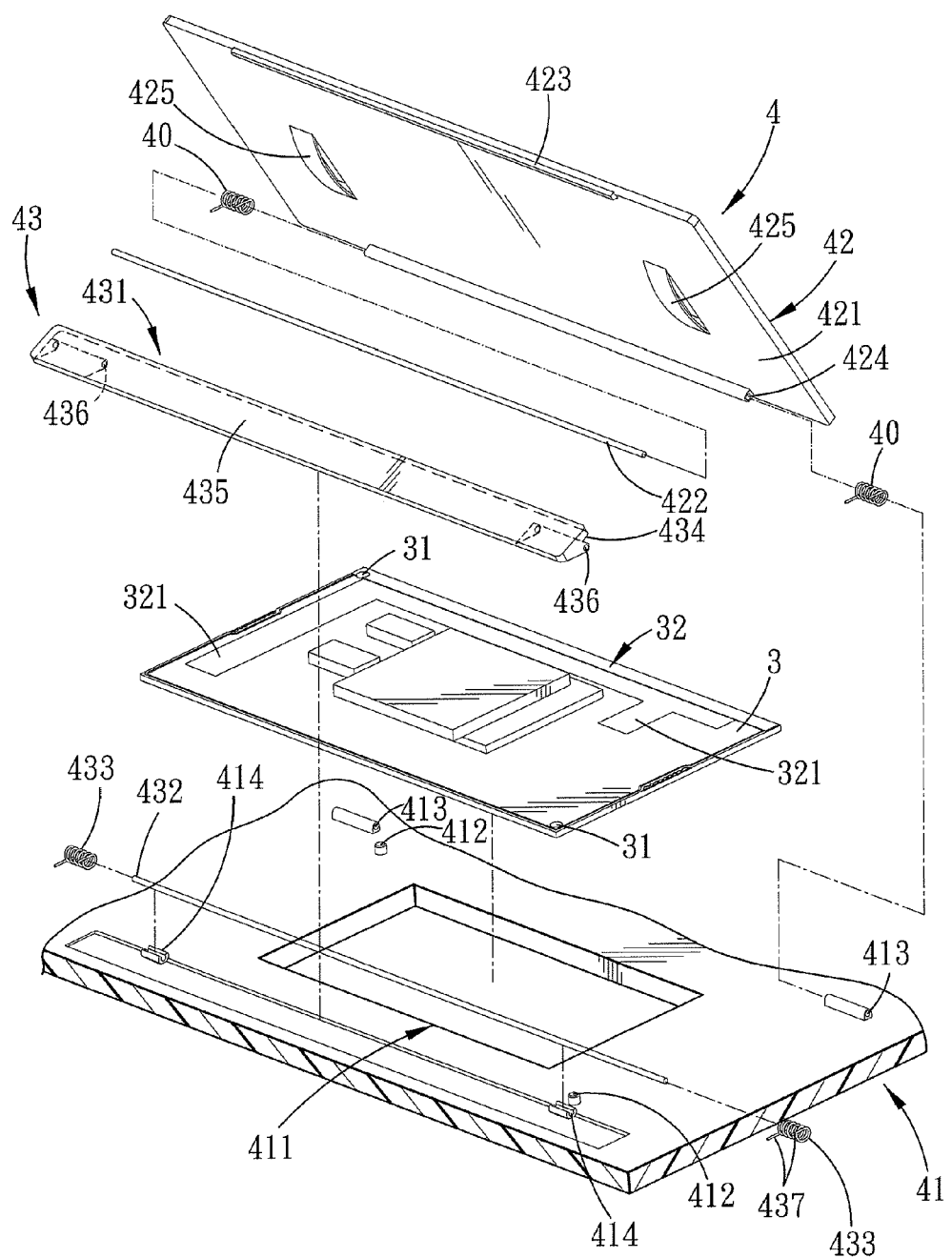
FIG. 5 is an exploded perspective view of the first preferred embodiment of a touch control panel securing device of an electronic apparatus according to the present invention.
Figure 6:
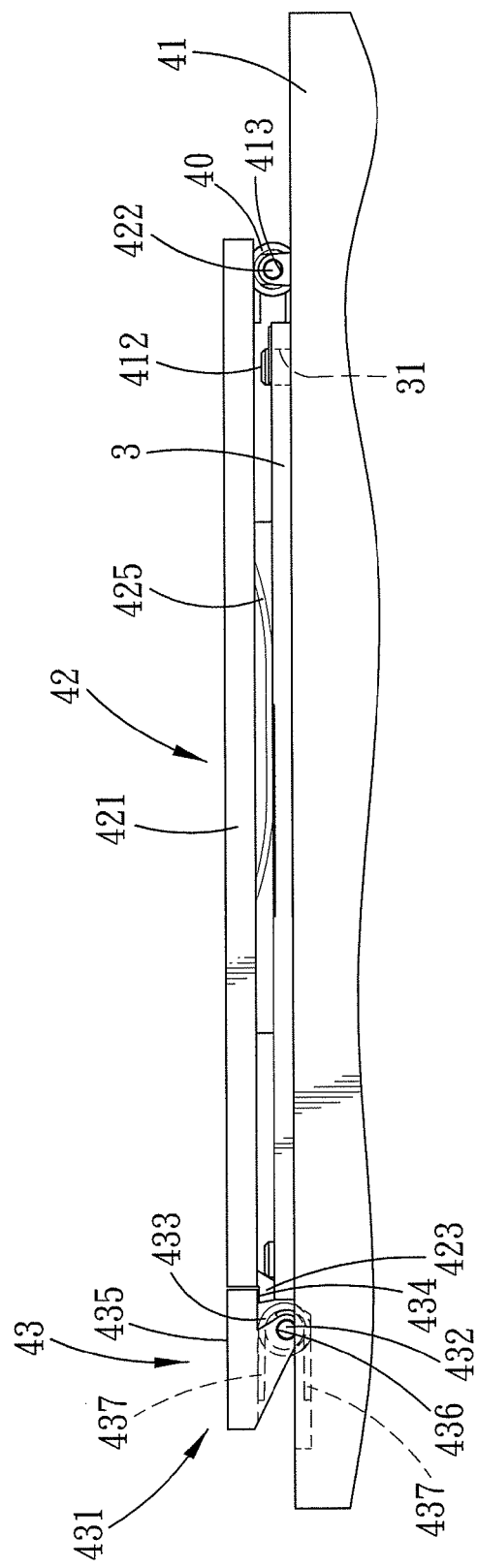
FIG. 6 is a side perspective view of the first preferred embodiment of a touch control panel securing device of an electronic apparatus according to the present invention for illustrating how a locking mechanism is disposed in a locking state by engaging a pressing member.

As shown in FIGS. 4, 5, and 6, the touch control panel securing device 4 comprises a housing 41, a pressing member 42, and a locking mechanism 43. The housing 41 is fixed to a top of the bottom casing 2 through an engaging or fastening configuration (see FIG. 3). The housing 41 is formed with an opening 411, and includes a pair of positioning studs 412, each of which is disposed on an inner side thereof and is proximate to a respective one of right and left lateral sides of the opening 411. The touch control panel 3 is formed with a pair of positioning holes 31, each of which is adjacent to a respective one of the left and right lateral sides thereof, and corresponds in position with a respective one of the positioning studs 412. By extending the positioning studs 412 through the positioning holes 31, the touch control panel 3 engages fixedly the inner side of the housing 41 and corresponds in position to the opening 411, and the touch control panel 3 does not undergo left/right or front/rear movement relative to the housing 41. Hence, a user can access the touch control panel 3 through the opening 411 from outside of the housing 41.

The pressing member 42 is used to press on the touch control panel 3, and includes a plate body 421, a first engaging portion 422 disposed at a rear end of the plate body 421, and a second engaging portion 423 disposed on the plate body 421 on an end thereof opposite to the first engaging portion 422. In this embodiment, the first engaging portion 422 is a pivot axle, and the second engaging portion 423 is an elongate engaging hook. The pivot axle extends through a passage 424 formed on a rear end of the plate body 421, and two ends thereof extend respectively through two pivot connection holes 413 formed on the housing 41. Therefore, the pressing member 42 is pivotable relative to the housing 41 through the first engaging portion 422.

Additionally, a metal layer 32 is disposed on the touch control panel 3. The metal layer 32 has a pair of metal contact portions 321 that are spaced apart from each other in a left-to-right direction, and that extend respectively in a front-to-rear direction. The pressing member 42 is made of metal and the plate body 421 is bent downward to form a pair of pressing portions 425 that are spaced apart from each other in the left-to-right direction. Each of the pressing portions 425 is an arcuate resilient plate for pressing a respective one of the metal contact portions 321 so that the metal layer 32 of the touch control panel 3 can be grounded through the pressing member 42. Moreover, the pressing member 42 covers over the touch control panel 3 so as to achieve the effect of shielding from electromagnetic interference (EMI) and to prevent electrostatic discharge (ESD), thereby preventing other electronic components inside the housing 41 from affecting the touch control panel 3. It is to be noted that, in this embodiment, there are two metal contact portions 321 of the metal layer 32 and two pressing portions 425 of the pressing members 42. However, in practice, the number of these components may be changed without altering the grounding effect.

Figure 7:
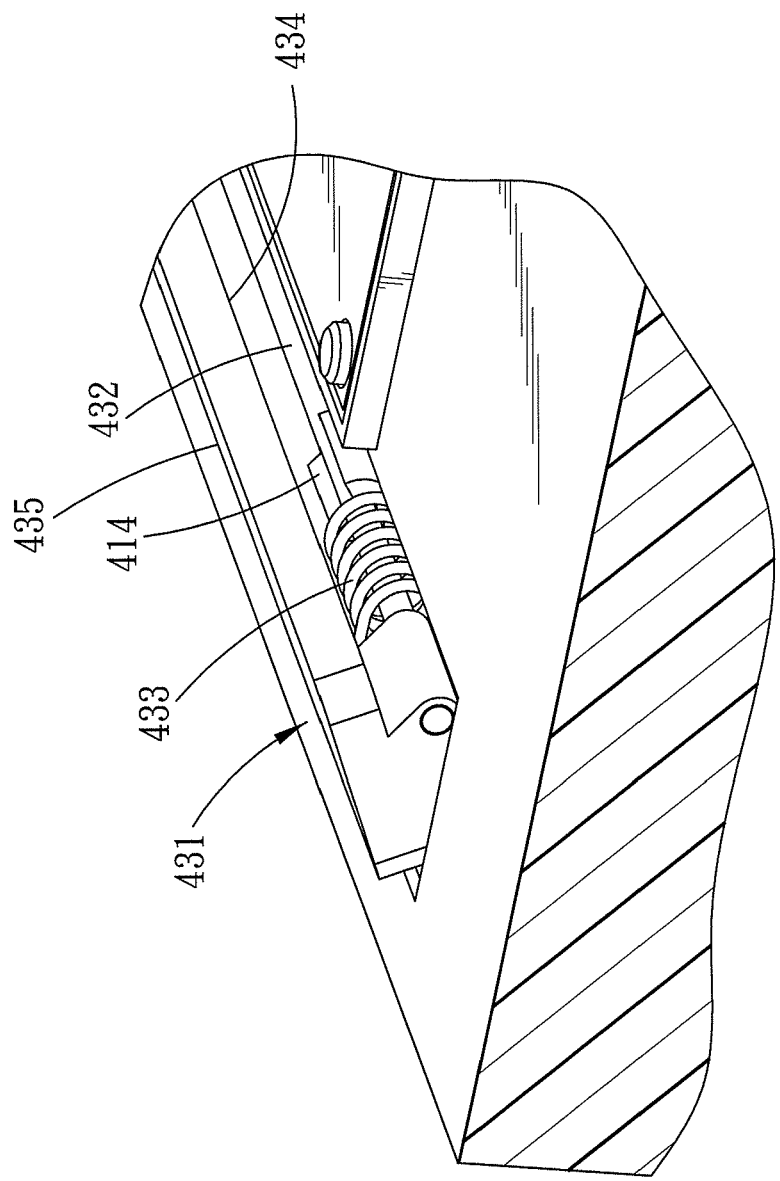
FIG. 7 is a partly enlarged perspective view of the first preferred embodiment of a touch control panel securing device of an electronic apparatus according to the present invention.

As shown in FIGS. 5, 6, and 7, the locking mechanism 43 includes a press button 431, a pivot connection axle 432, and a pair of first biasing springs 433. The press button 431 is rectangular and comprises an engaging part 434 disposed at a bottom end for engaging the second engaging portion 423, and a pressing part 435 disposed at a top end and operable to be pressed. The pivot connection axle 432 extends through a pair of receiving holes 436 formed on the press button 431 and disposed below the engaging part 434, and is connected pivotably to a pair of arcuate pivot connection slots 414 formed on the housing 41. Hence, the press button 431 is pivotable about the pivot connection axle 432 relative to the housing 41. Each of the first biasing springs 433 is a torsion spring sleeved on the pivot connection axle 432 and includes a pair of spring arms 437 that extend forwardly and abut respectively against the housing 41 and the engaging part 434 of the press button 431 to provide a restorative force for the press button 431.

To mount the touch control panel 3 fixedly to the housing 41, first, the positioning studs 412 of the housing 41 are extended through the positioning holes 31 of the touch control panel 3 so as to position the touch control panel 3 to the location corresponding to the opening 411. Next, the pressing member 42 is moved to cover over the touch control panel 3 and the pressing portions 425 are pressed against the metal contact portions 321 of the metal layer 32, and through biasing of the press button 431 by the first biasing springs 433, the engaging part 434 of the press button 431 engages a top end of the second engaging portion 423 of the pressing member 42, and the pressing portions 425 are pressed on the metal contact portions 321 and slightly deformed in this state as a result of engagement between the engaging part 434 and the second engaging portion 423. At this time, the locking mechanism 43 is disposed in a locking state, and the touch control panel 3 is firmly positioned to the housing 41 by the pressing of the pressing member 42.

Figure 8:
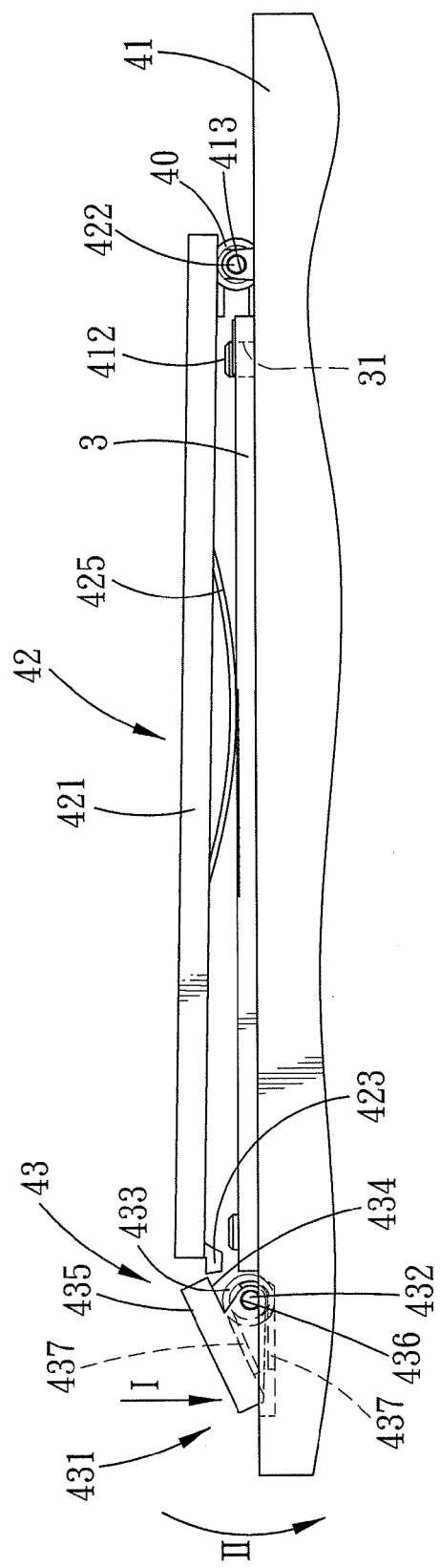
FIG. 8 is a side perspective view of the first preferred embodiment of a touch control panel securing device of an electronic apparatus according to the present invention for illustrating how the locking mechanism is disposed in a released state by disengaging the pressing member.
Figure 9:
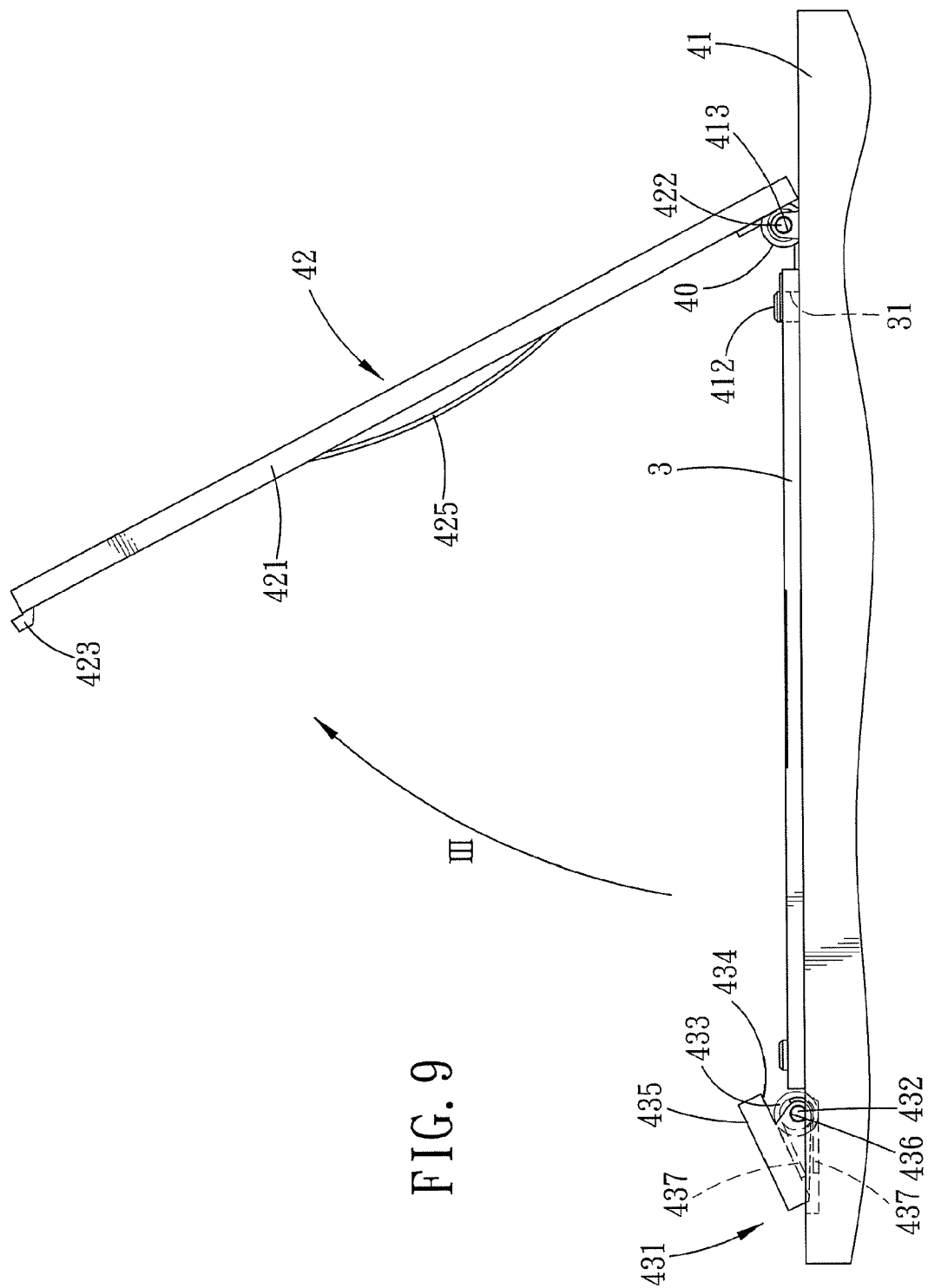
FIG. 9 is a side perspective view of the first preferred embodiment of a touch control panel securing device of an electronic apparatus according to the present invention for illustrating the pressing member disposed in an opening position.

As shown in FIGS. 8 and 9, to remove the touch control panel 3 from the housing 41 for repair or replacement, the user presses a front end of the pressing part 435 of the press button 431 along a direction shown by an arrow (I), such that the press button 431 is pivoted about the pivot connection axle 432 along a direction shown by an arrow (II) relative to the housing 41, and the engaging part 434 of the press button 431 compresses one of the spring arms 437 of each of the first biasing springs 433 toward the other one of the spring arms 437 thereof. When the press button 431 is pivoted to a position such that the engaging part 434 is separated from the second engaging portion 423, the locking mechanism 43 is disposed in a released position. By the restorative force of the pressing portions 425, the pressing member 42 is pivoted about the first engaging portion 422 along a direction shown by an arrow (III) to an appropriate angle. Thereafter, when the pressing part 435 of the press button 431 is released, by the restorative force provided by the first biasing springs 433, the press button 431 is returned to the position as shown in FIG. 6. Next, the user may move the pressing member 42 to a greater opening angle, after which the touch control panel 3 may be pulled upward so that the positioning holes 31 are separated from the positioning studs 412, such that the touch control panel 3 is disassembled from the housing 41. Preferably, the touch control panel securing device 4 further comprises a pair of second biasing springs 40 (as shown in FIG. 5). Each of the second biasing springs 40 is a torsion spring sleeved on the first engaging portion 422 and is used for biasing the pressing member 42 away from the housing 41. When the locking mechanism 43 is in the released position, through the biasing of the pressing member 42 by the second biasing springs 40, the pressing member 42 can be sprung up to an open position with a larger angle as shown in FIG. 9 so that the user can remove the touch control panel 3 from the housing 41.

It is to be noted that, in this embodiment, although a description is provided in which there are two first biasing springs 433 and two second biasing springs 40, in practice, there may only be one of each of these elements.

Figure 10:
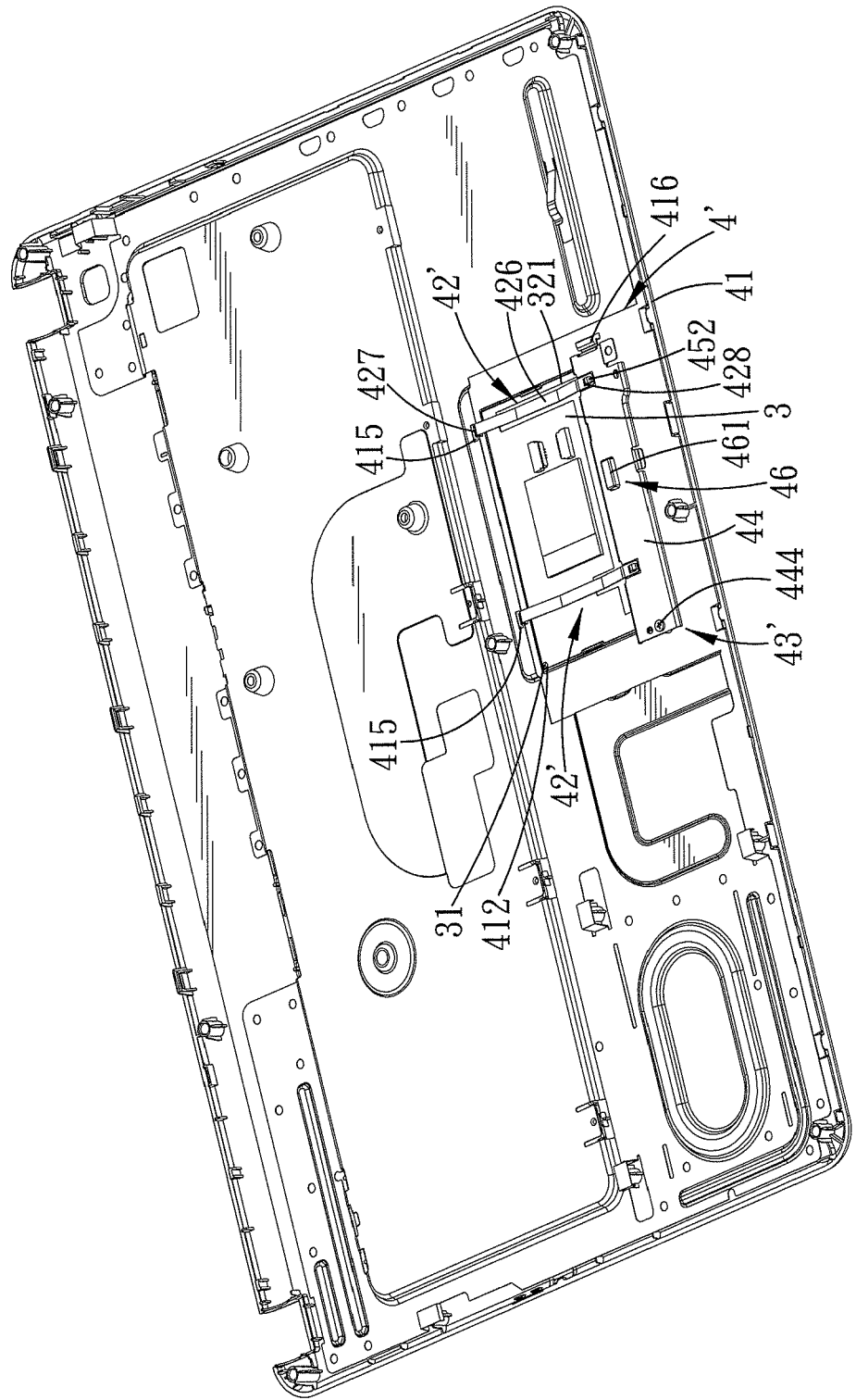
FIG. 10 is a perspective view of the second preferred embodiment of an electronic apparatus having a touch control panel securing device according to the present invention.
Figure 11:
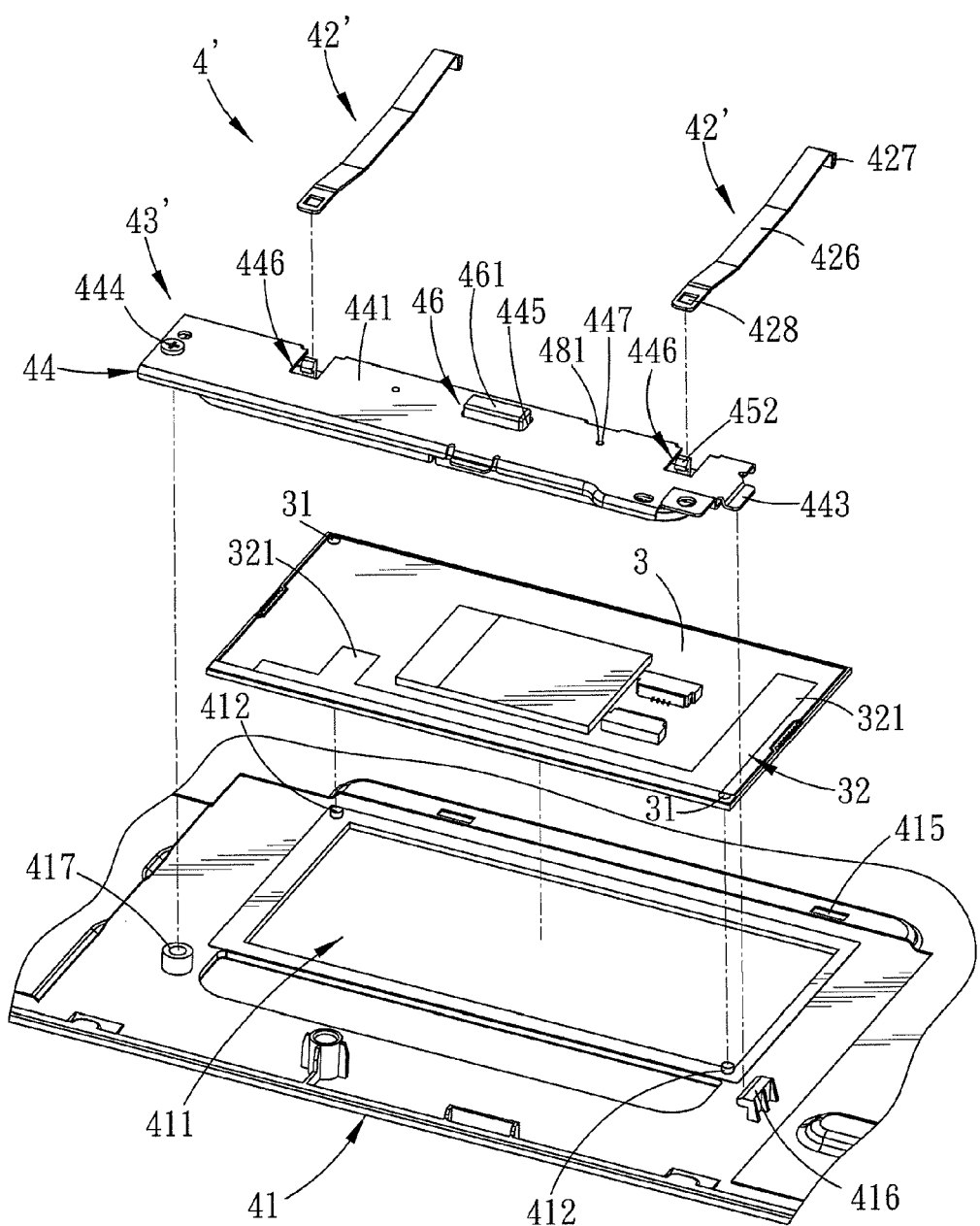
FIG. 11 is an exploded perspective view of the second preferred embodiment of a touch control panel securing device of an electronic apparatus according to the present invention.

Referring to FIGS. 10 and 11, the second preferred embodiment of an electronic apparatus having a touch control panel securing device of this invention is shown to be generally identical to the first preferred embodiment in structure. The differences reside in the structure and method of operating the touch control panel securing device 4'.

There are two of the pressing members 42' of the touch control panel securing device 4'. Each of the pressing members 42' is a resilient arm made of metal, and includes a pressing portion 426 for pressing on the metal contact portion 321, a first engaging portion 427 disposed at a rear end of the pressing portion 426, and a second engaging portion 428 disposed at a front end of the pressing portion 426. In this embodiment, the first engaging portion 427 is an engaging hook for engaging a coupling hole 415 formed on the housing 41, and the second engaging portion 428 is an engaging hole.

Figure 12:
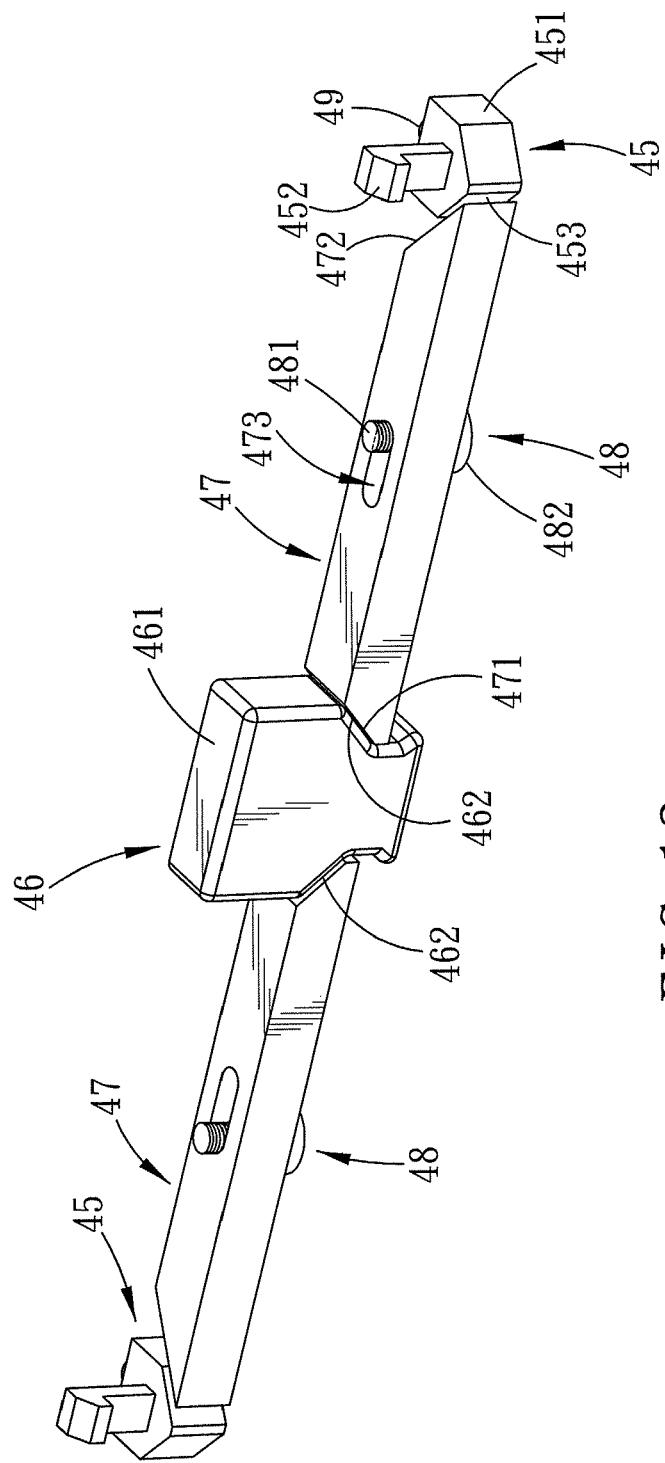
FIG. 12 is a perspective view of a locking mechanism of the second preferred embodiment of an electronic apparatus having a touch control panel securing device according to the present invention, in which a support frame is omitted from the illustration.
Figure 13:
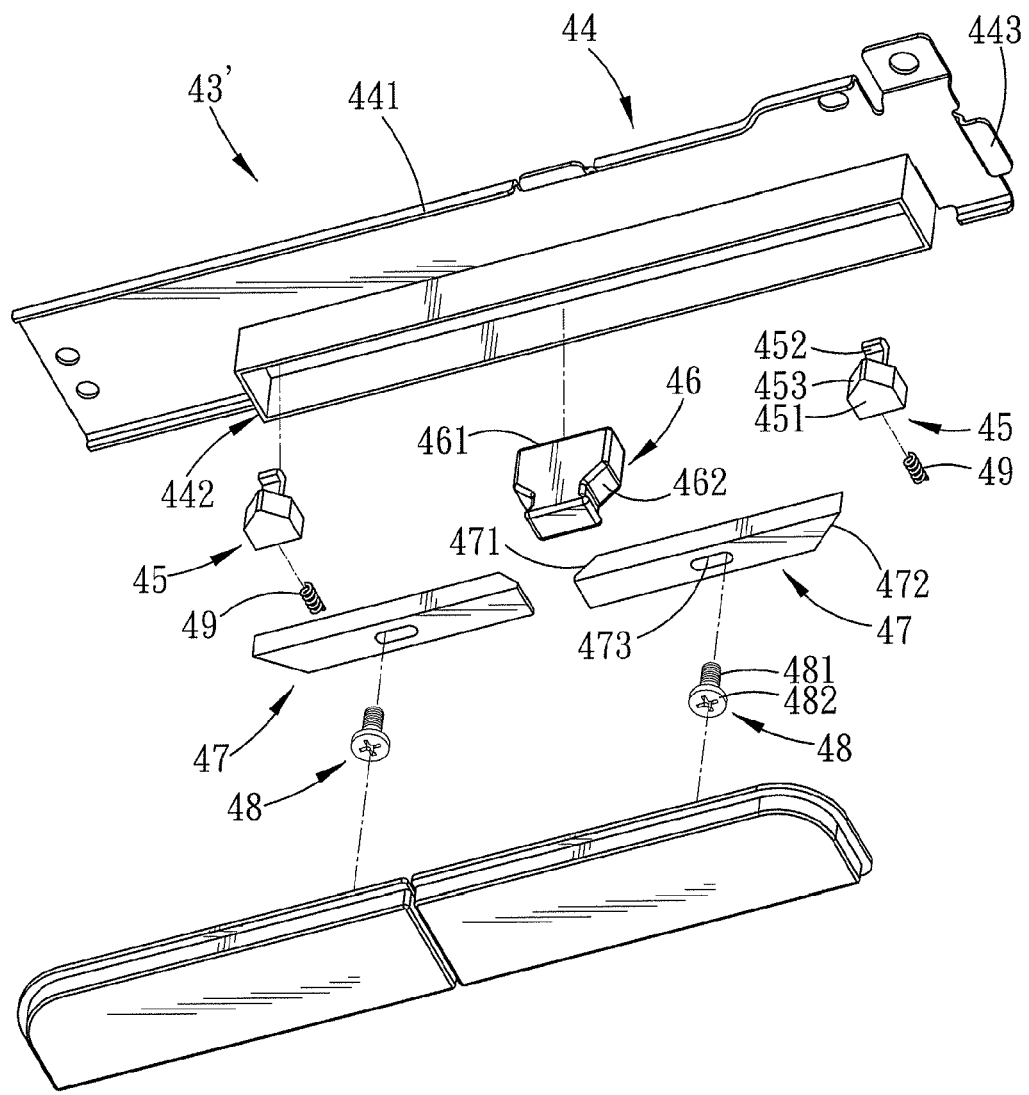
FIG. 13 is an exploded perspective view of the locking mechanism of the second preferred embodiment of an electronic apparatus having a touch control panel securing device according to the present invention.

As shown in FIGS. 11, 12, and 13, the locking mechanism 43' includes a support frame 44, a pair of engaging elements 45 disposed on the support frame 44, a push button 46, and a pair of push rods 47. The support frame 44 comprises a mounting plate 441 and a surrounding wall 442 formed protruding from a bottom side of the mounting plate 441. The right lateral side of the mounting plate 441 of the support frame 44 can use an engaging plate 443 to engage an engaging hook 416 formed on the housing 41, and the left lateral side of the mounting plate 441 of the support frame 44 can be fastened to a threaded hole 417 formed on the housing 41 by a fastener 444 so that the support frame 44 is assembled fixedly to the housing 41. Moreover, the mounting plate 441 is formed with a through hole 445 which extends in a direction parallel the elongate axis of the support frame 44, and is further formed with a pair of guiding slots 446 positioned respectively to the left and right of the through hole 445. The through hole 445 is used for the push button 46 to extend through and also restricts the push button 46 to move in a vertical direction relative to the mounting plate 441. Each of the guiding slots 446 extends in the front-to-rear direction and is used for a respective one of the engaging elements 45 to extend through and slide therealong in the front-to-rear direction relative to the mounting plate 441. The push button 46 is mounted in the surrounding wall 442 and includes a pressing part 461 extending through the through hole 445 for depression. The push button 46 further includes a pair of first inclined faces 462 disposed at respective lateral sides thereof and facing the housing 41. Each of the first inclined faces 462 is tapered downward from a middle section of the push button 46. Each of the engaging elements 45 is mounted in the surrounding wall 442 and includes a sliding block 451 for being slidably engaged in a respective one of the guiding slots 446. Each of the engaging elements 45 further includes an engaging part 452 disposed on top of the sliding block 451 and having a hook shape. The engaging part 452 of each engaging element 45 is able to engage the second engaging portion 428 of a corresponding one of the pressing members 42'. The sliding block 451 of each engaging element 45 has an inner side provided with a second inclined face 453 facing forward. Each of the second inclined faces 453 is tapered forward from a middle section of the sliding block 451. Each of the push rods 47 is mounted in the surrounding wall 442 and is disposed between the push button 46 and the sliding block 451 of a respective one of engaging elements 45. Each of the push rods 47 may be pushed by the push button 46 to drive the engaging elements 45 to slide. Each of the push rods 47 comprises an inner side formed with a third inclined face 471 for abutting against the first inclined face 462, a fourth inclined face 472 disposed opposite the third inclined face 471 and for abutting against the second inclined face 453, and an elongate guide slot 473 extending parallel to an axis of the push rod 47.

Figure 14:
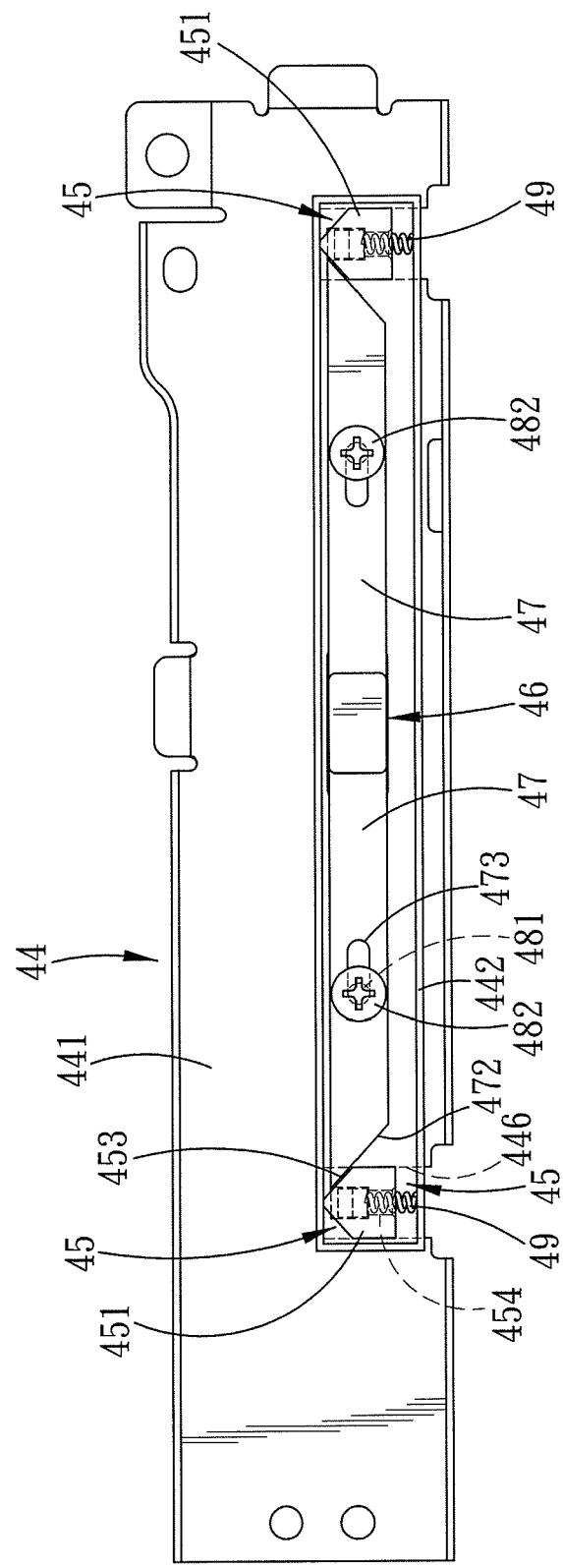
FIG. 14 is a bottom perspective view of the locking mechanism of the second preferred embodiment of an electronic apparatus having a touch control panel securing device according to the present invention for illustrating the locking mechanism disposed in a locking state.

The locking mechanism 43' further includes a pair of stop elements 48. Each of the stop elements 48 is a fastener, and includes a shaft section 481 and a head section 482 disposed at a bottom of the shaft section 481 and having a diameter larger than the shaft section 481. The shaft section 481 of each of the stop elements 48 is used to extend through the corresponding one of the elongate guide slots 473 and is fastened to a threaded hole 447 formed in the mounting plate 441 so that the stop element 48 is capable of being fastened fixedly to the mounting plate 441 and the head section 481 is stopped at a side of the push rod 47 facing the housing 41. In such a manner, each of the push rods 47 is limited to move in the surrounding wall 422 along a direction parallel to the axes thereof. Each of the first biasing springs 49 of the locking mechanism 43' is a compression spring mounted in a retaining groove 454 of each of the engaging elements 45 (as shown in FIG. 14) and abuts against an inner wall face of the surrounding wall 442. Each of the first biasing springs 49 is used to bias the corresponding one of the engaging elements 45 forward and provides a restorative force to each of the engaging elements 45.

Figure 15:
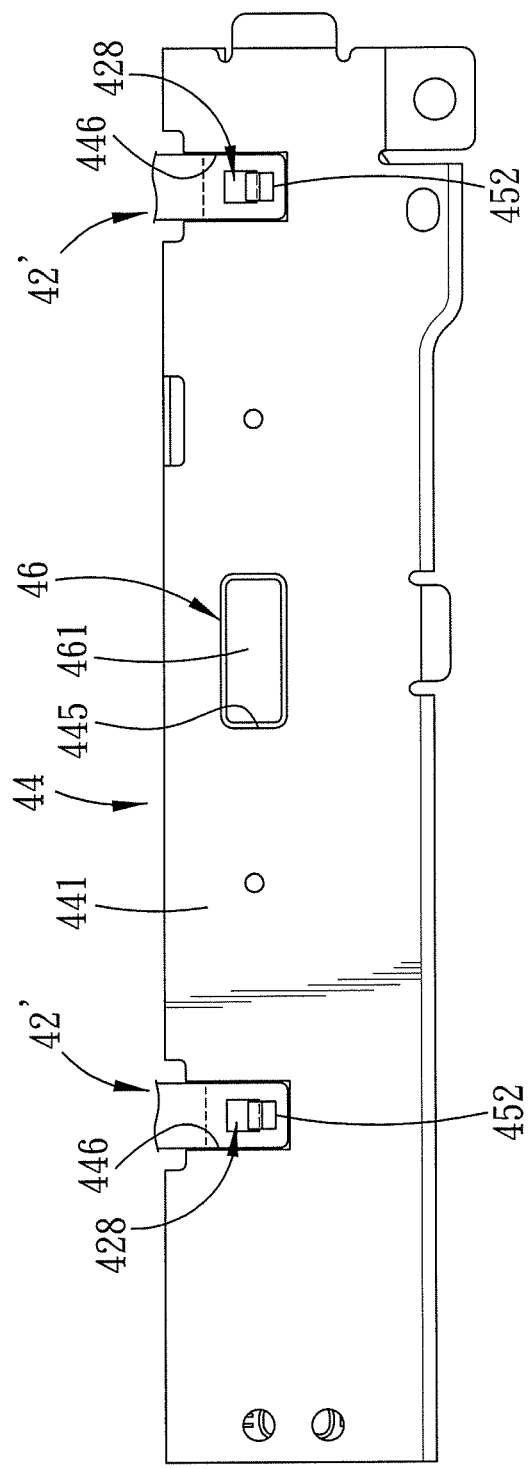
FIG. 15 is a perspective view of the locking mechanism of the second preferred embodiment of an electronic apparatus having a touch control panel securing device according to the present invention for illustrating the locking mechanism disposed in a locking state and the engaging parts of the engaging elements engaging the second engaging portions of the pressing member.
Figure 16:
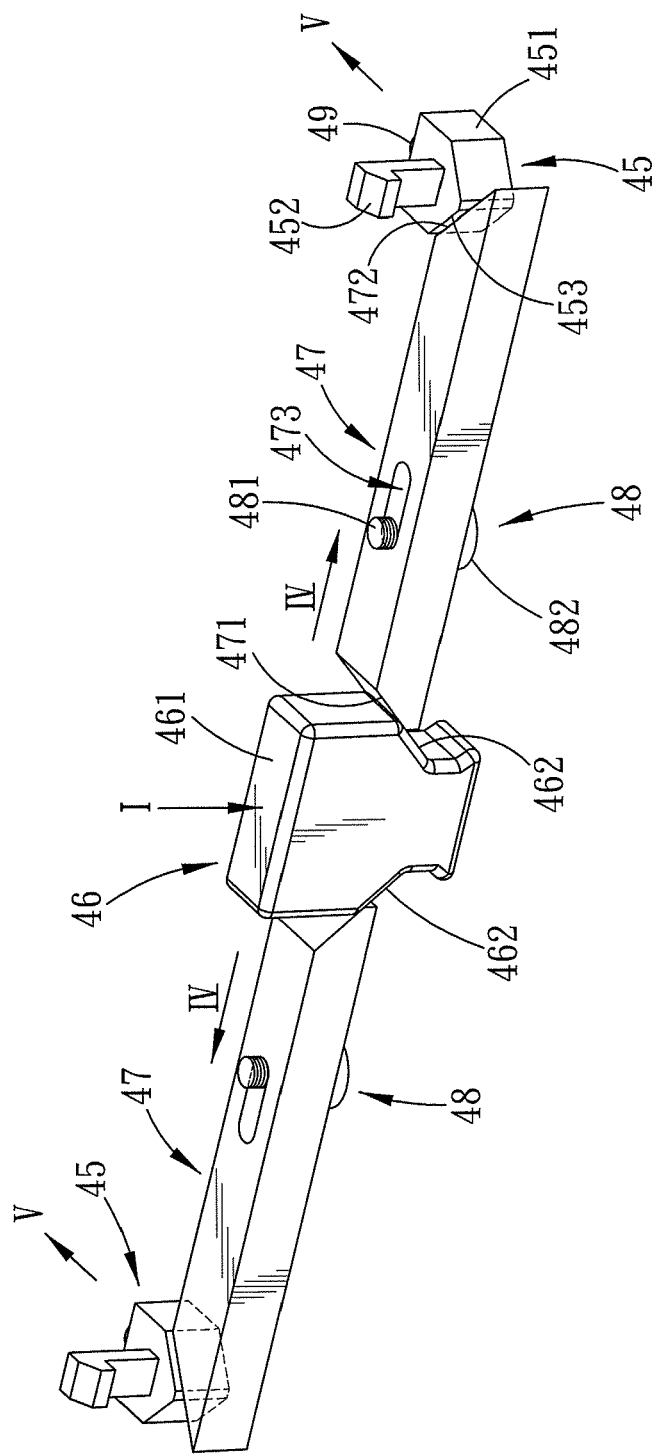
FIG. 16 is a schematic view of the second preferred embodiment of an electronic apparatus having a touch control panel securing device according to the present invention for illustrating how when the pressing button moves toward the housing, the push rods move outwardly and horizontally to push the engaging elements to move rearward.
Figure 17:
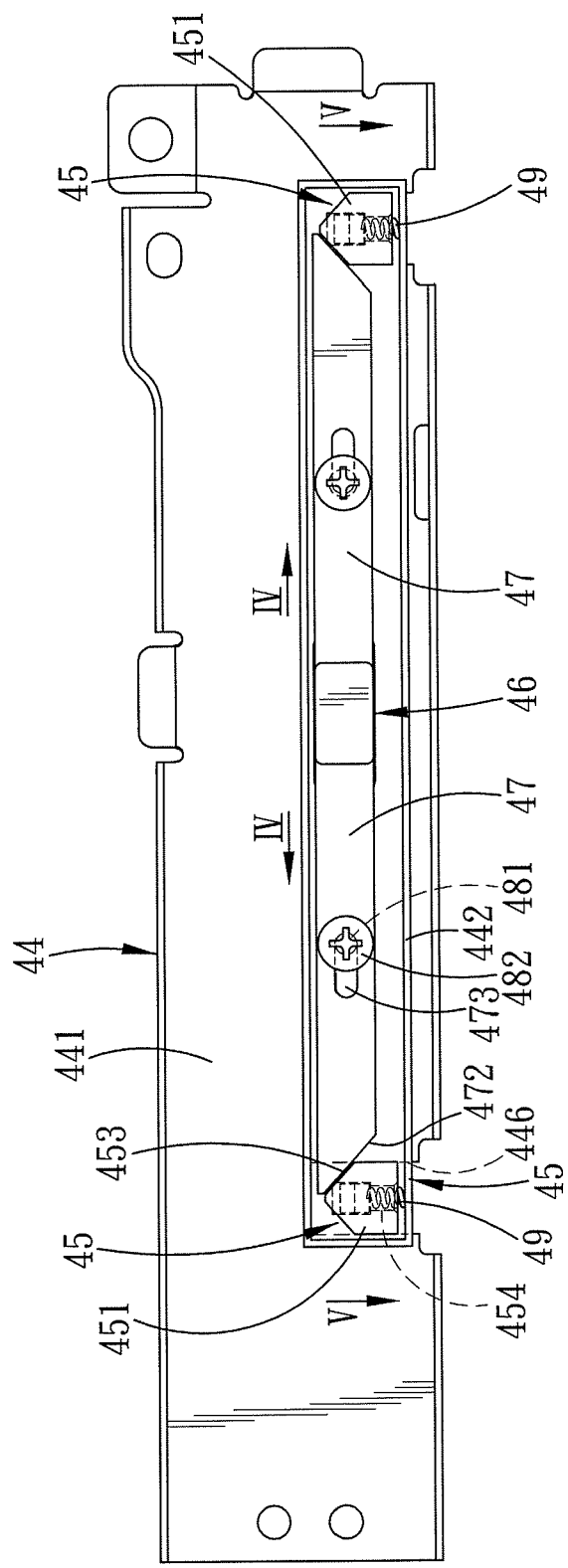
FIG. 17 is a bottom perspective view of the second preferred embodiment of an electronic apparatus having a touch control panel securing device according to the present invention for illustrating the locking mechanism disposed in a released state.
Figure 18:
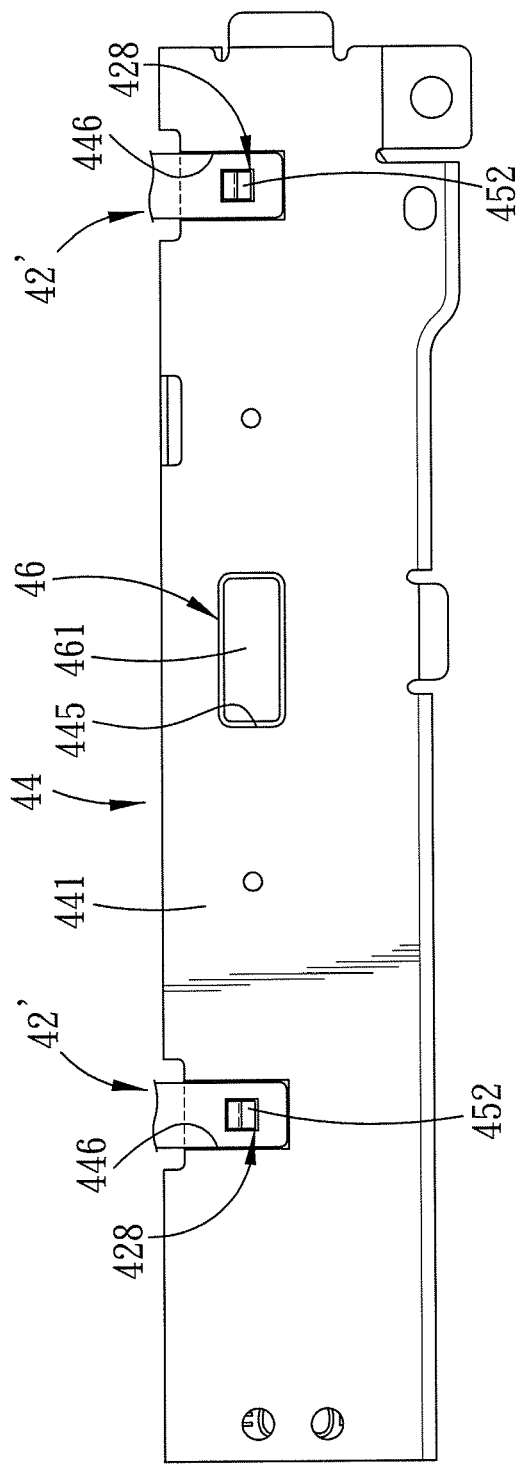
FIG. 18 is schematic view of the second preferred embodiment of an electronic apparatus having a touch control panel securing device according to the present invention for illustrating the locking mechanism disposed in a released state and the engaging parts of the engaging elements disengaged from the second engaging portions of the pressing member.

As shown in FIGS. 10, 14 and 15, to mount the touch control panel 3 fixedly to the housing 41, first, the positioning studs 412 of the housing 41 are extended through the positioning holes 31 of the touch control panel 3 so as to position the touch control panel 3 to the location corresponding to the opening 411 (as shown in FIG. 11). Next, the first engaging portion 427 of each pressing member 42' is engaged to the corresponding one of the coupling holes 415 of the housing 41, and the second engaging portion 428 of each pressing member 42' is engaged to the corresponding one of the engaging part 452 of each of the engaging elements 45. Through the biasing of the engaging elements 45 by the first biasing springs 49, the sliding block 451 of each of the engaging elements 45 abuts against an inner wall face of the surrounding wall 442 and a front end of a corresponding one of the guiding slots 446, and the engaging part 452 engages the corresponding one of the second engaging portions 428. At this time, the locking mechanism 43' is disposed in a locking state, and the touch control panel 3 is firmly positioned on the housing 41 by the pressing of the pressing members 42'.

As shown in FIGS. 11, 16, 17, and 18, to remove the touch control panel 3 from the housing 41, the user presses on the pressing part 461 of the press button 46 along a direction shown by an arrow (I) so that the push button 46 moves toward the housing 41. Since each of the push rods 47 is stopped by the head section 482 of a corresponding one of the stop elements 48, when the first inclined faces 462 of the push button 46 abut against the third inclined faces 471 of the push rods 47, the lateral force components exerted on the third inclined faces 471 by the pushbutton 46 pushes the push rods 47 to move along the outward directions shown by an arrow (IV). Since the sliding block 451 of each of the engaging elements 45 engaging a corresponding one of the guiding slots 446 can only move along the extending direction thereof, when the fourth inclined faces 472 of the push rods 47 abut against the second inclined faces 453 of the engaging elements 45 during when each push rod 47 moves horizontally outward, the lateral force components exerted on the second inclined faces 453 by the push rods 47 pushes the engaging elements 45 to move along the rearward directions shown by an arrow (V) such that the engaging parts 452 are separated from the second engaging portions 428 of the pressing members 42', and the engaging parts 452 of the engaging elements 45 compress the first biasing springs 49. At this time, the locking mechanism 43' is disposed in a released position. By the restorative force of the pressing members 42', the second engaging portions 428 move upward and disengage from the engaging parts 452. Thereafter, when the pressing part 461 of the push button 46 is released, by the restorative force of the first biasing springs 49, the engaging elements 45 return to the position as shown in FIG. 14, and the engaging elements 45 also move the push rods 47 and the push button 46 back to their original positions. The user then manipulates the pressing members 42' to an open position with a larger angle so that the touch control panel 3 can be removed from the housing 41.

It should be noted that, while there are two of the pressing members 42' in this embodiment, in practice, there may only be one. Therefore, there may also be one of each of the engaging elements 45, the push rods 47, the stop elements 48, and the first biasing springs 49, and the present invention is not limited in this regard.

From the aforementioned, with the two embodiments of the electronic apparatus 200, through the design of the touch control panel securing devices 4, 4', the user does not need a tool like a screwdriver for securely mounting the touch control panel 3 onto or dismounting the touch control panel from the housing 41 in a convenient and quick manner, such that assembly and disassembly time is saved. Moreover, by pressing the pressing portions 425, 426 of the pressing members 42, 42' on the metal contact portions 321 of the touch control panel 3, a grounding effect is achieved.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A touch control panel securing device for fixing a touch control panel, said touch control panel comprising:
    a housing formed with an opening, the touch control panel being mounted within said housing and being registered with said opening;
    at least one pressing member for pressing the touch control panel, and including a first engaging portion engaging said housing, and a second engaging portion disposed opposite to said first engaging portion; and
    a locking mechanism including at least one engaging part for engaging said second engaging portion and a pressing part operable to be pressed for disengaging said engaging part from said second engaging portion.

2. The touch control panel securing device of claim 1, wherein the touch control panel comprises a metal contact portion, said pressing member including a pressing portion for pressing the metal contact portion.

3. The touch control panel securing device of claim 2, wherein said locking mechanism includes a press button that has said engaging part and said pressing part, and that is mounted pivotably on said housing, and a first biasing spring for biasing said press button, said engaging part engaging said second engaging portion.

4. The touch control panel securing device of claim 3, wherein said first engaging portion is a pivot axle connected pivotably to said housing, said pressing member being pivotable about said pivot axle relative to said housing, said touch control panel securing device further comprising a second biasing spring for biasing said pressing member in a direction away from said housing.

5. The touch control panel securing device of claim 2, wherein said pressing member is a resilient arm, said first engaging portion is an engaging hook disposed at a rear end of said pressing member for engaging a coupling hole of said housing, and said second engaging portion is an engaging hole disposed at a front end of said pressing member for engaging said engaging part.

6. The touch control panel securing device of claim 5, wherein said locking mechanism includes at least one engaging element having said engaging part, a pressing button having said pressing part, and at least one push rod disposed between said engaging element and said pressing button, said pressing button comprising a first inclined face facing said housing, said engaging element comprising a second inclined face facing forward, said push rod comprising a third inclined face abutting against said first inclined face, and a fourth inclined face disposed opposite said third inclined face and abutting against said second inclined face, when said pressing button is moved toward said housing, said push rod is moved outwardly to push said engaging element to move rearwardly to disengage said engaging part from said second engaging portion.

7. The touch control panel securing device of claim 6, wherein said locking mechanism further includes a first biasing spring for biasing said engaging part to move forward to engage said second engaging portion.

8. The touch control panel securing device of claim 7, wherein said locking mechanism further includes a support frame that is mounted in said housing, said support frame being formed with an elongate through hole extending parallel to an elongate axis of said support frame for said pressing button to extend through and at least one guiding slot extending in a direction transverse the elongate axis of said support frame for said engaging element to extend through and slide therealong, and including a stop element, said push rod being further formed with an elongate guiding hole, said stop element including a shaft section for extending through said guiding hole, and a head section for stopping said push rod to move toward a lateral side of said housing.

9. The touch control panel securing device of claim 8, further comprising a pair of pressing members, said locking mechanism including a pair of engaging parts, a pair of engaging elements each having a respective one of said engaging parts, a pair of push rods disposed on left and right lateral sides of said pressing button, and a pair of first biasing springs respectively biasing said engaging elements, said support frame being formed with a pair of guiding slots each extending in a direction transverse the elongate axis of said support frame for a respective one of said engaging elements to extend through and slide therealong, said support frame including a pair of stop elements each of which stops a respective one of said push rods.

10. The touch control panel securing device of claim 1, wherein the touch control panel is formed with a pair of positioning holes which are adjacent to left and right lateral sides of the touch control panel, said housing including a pair of positioning studs registered respectively with the positioning holes.

11. An electronic apparatus having a touch control panel securing device comprising:
a touch control panel; and
a touch control panel securing device comprising a housing formed with an opening, said touch control panel being mounted within said housing and being registered with said opening,
at least one pressing member for pressing the touch control panel, and including a first engaging portion engaging said housing, and a second engaging portion disposed opposite to said first engaging portion, and
a locking mechanism including at least one engaging part for engaging said second engaging portion and a pressing part operable to be pressed for disengaging said engaging part from said second engaging portion.

12. The electronic apparatus of claim 11, wherein said touch control panel includes a metal contact portion, said pressing member including a pressing portion for pressing said metal contact portion.

13. The electronic apparatus of claim 12, wherein said locking mechanism includes a press button that has said engaging part and said pressing part, and that is mounted pivotably on said housing, and a first biasing spring for biasing said press button, said engaging part engaging said second engaging portion.

14. The electronic apparatus of claim 13, wherein said first engaging portion is a pivot axle connected pivotably to said housing, said pressing member being pivotable about said pivot axle relative to said housing, said touch control panel securing device further comprising a second biasing spring for biasing said pressing member in a direction away form said housing.

15. The electronic apparatus of claim 12, wherein said pressing member is a resilient arm, said first engaging portion is an engaging hook disposed at a rear end of said pressing member for engaging a coupling hole of said housing, and said second engaging portion is an engaging hole disposed at a front end of said pressing member for engaging said engaging part.

16. The electronic apparatus of claim 15, wherein said locking mechanism includes at least one engaging element that includes said engaging part, a pressing button having said pressing part, and at least one push rod disposed between said engaging element and said pressing button, said pressing button comprising a first inclined face facing said housing, said engaging element comprising a second inclined face facing forward, said push rod comprising a third inclined face abutting against said first inclined face, and a fourth inclined face disposed opposite said third inclined face and abutting against said second inclined face, when said pressing button is moved toward said housing, said push rod is moved outwardly to push said engaging element to move rearwardly to disengage said engaging part from said second engaging portion.

17. The electronic apparatus of claim 16, wherein said locking mechanism further includes a first biasing spring for biasing said engaging part to move forward to engage said second engaging portion.

18. The electronic apparatus of claim 17, wherein said locking mechanism further includes a support frame that is mounted in said housing, said support frame being formed with an elongate through hole extending parallel an elongate axis of said support frame for said pressing button to extend through and at least one guiding slot extending in a direction transverse the elongate axis of said support frame for said engaging element to extend through and slide therealong, and including a stop element, said push rod being further formed with an elongate guiding hole, said stop element including a shaft section for extending through said guiding hole, and a head section for stopping said push rod to move toward a lateral side of said housing.

19. The electronic apparatus of claim 18, said touch control panel securing device further comprising a pair of pressing members, said locking mechanism including a pair of engaging parts, a pair of engaging elements each having a respective one of said engaging parts, a pair of push rods disposed on left and right lateral sides of said pressing button, and a pair of first biasing springs respectively biasing said engaging elements, said support frame being formed with a pair of guiding slots each extending in a direction transverse the elongate axis of said support frame for a respective one of said engaging elements to extend through and slide therealong, said support frame including a pair of stop elements each of which stops a respective one of said push rods.

20. The electronic apparatus of claim 11, wherein said touch control panel is formed with a pair of positioning holes which are adjacent to left and right lateral sides of said touch control panel, said housing including a pair of positioning studs registered respectively with said positioning holes.

* * * * *